April 26, 1966  P. G. IVANCHICH  3,247,937
SYNCHRONIZER CLUTCH ASSEMBLY
Filed May 4, 1964  3 Sheets-Sheet 3
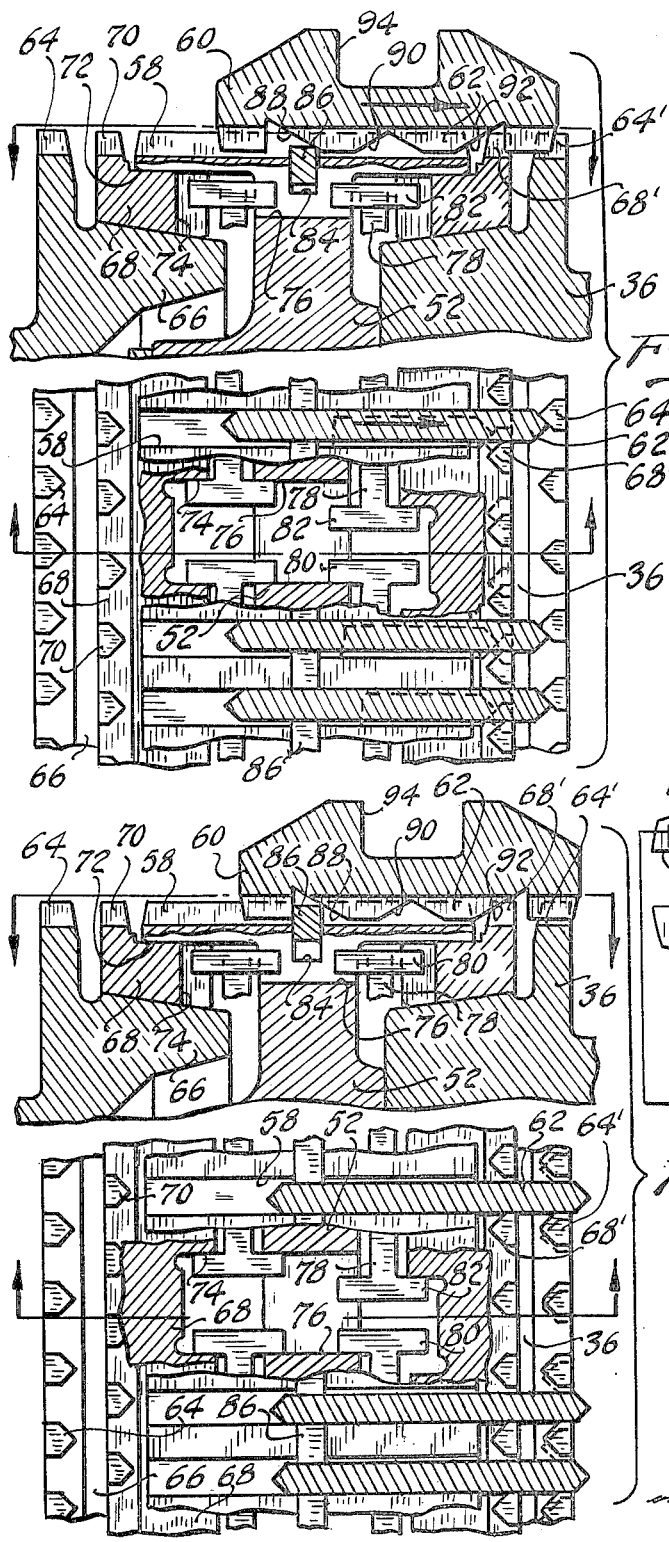
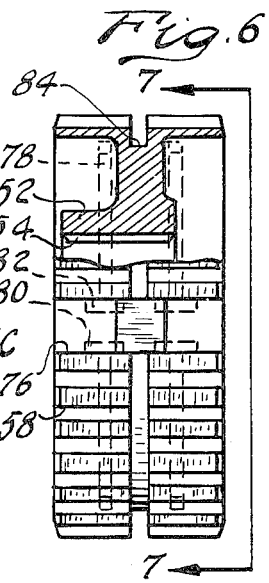
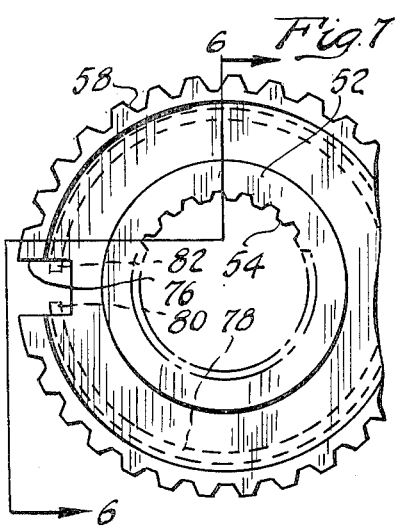
INVENTOR:
PETER G. IVANCHICH
BY
ATTORNEYS

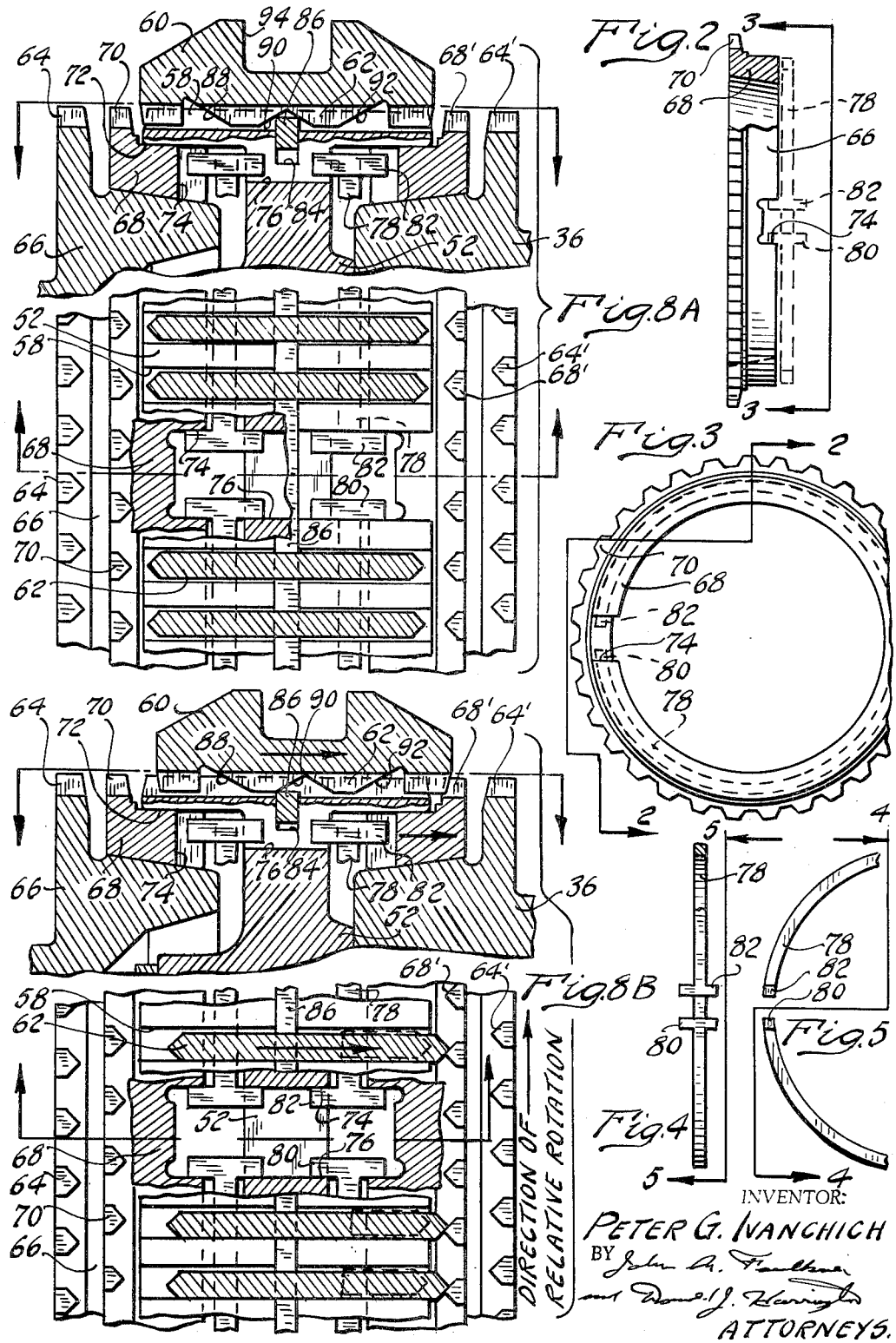

United States Patent Office 3,247,937
Patented Apr. 26, 1966

3,247,937
SYNCHRONIZER CLUTCH ASSEMBLY
Peter G. Ivanchich, Dearborn, Mich., assignor to Ford Motor Company, Dearborn, Mich., a corporation of Delaware
Filed May 4, 1964, Ser. No. 364,525
4 Claims. (Cl. 192—53)

My invention relates generally to synchronizer clutch assemblies for use in torque transmitting gear systems. More particularly it relates to a blocker ring synchronizer clutch assembly wherein provision is made for controlling the relative angular position of the blocker ring with respect to the axially shiftable clutch element, the shifting motion of the clutch element being controlled by the blocker ring.

My invention is an improvement in synchronizer clutch constructions of the type currently used in manually controlled transmissions for automotive vehicle drivelines. Such synchronizers are used for the purpose of clutching together two torque delivery members to establish speed ratio changes. A first clutch element having external clutch teeth is carried by one member and a synchronizer clutch sleeve having internal clutch teeth is carried by the other member. A driver controlled linkage system is used for shifting the sleeve selectively into engagement with the teeth of the first clutch element to establish a torque delivery path. If the two torque delivery members then are rotating at different speeds the blocker ring situated between the first clutch element and the clutch sleeve inhibits shifting movement of the sleeve during the time interval in which the relative inertia of the moving parts is dissipated. Once synchronism is established the sleeve may be shifted past the blocker ring into clutching engagement with the external clutch teeth.

The shifting effort applied to the sleeve is transferred to the blocker ring and this in turn causes a synchronizer cone clutch mechanism to become engaged, one member of the cone clutch mechanism being carried by the first clutch element and the other being formed on the blocker ring itself. The blocker ring is free to move with a limited degree of rotary lost motion with respect to the other torque delivery member.

The shifting effort applied to the sleeve is transferred to the blocker ring by means of thrust bars. A spring loaded detent connection between the sleeve and thrust bars creates the necessary thrust bar forces that act upon the blocker ring.

The operating positions of the sleeve normally are established by means of a suitable detent mechanism located in the driver controlled linkage system. It has been found in practice, however, that due to wear or maladjustment of the linkage system the sleeve does not always assume a fully disengaged position or a fully engaged position as the driver controlled portion of the linkage system is adjusted to its corresponding operating positions. It thus is possible for the driver to move the linkage system when the detent connection between the thrust bars and the sleeve is ineffective. Thus, the sleeve can be moved through the blocker ring directly into engagement with the external clutch teeth before synchronism is established between the torque delivery members. This creates an undesirable clashing of the synchronizer clutch teeth and accelerates wear.

It is an object of my invention to eliminate this shortcoming in conventional synchronizer mechanisms. In accomplishing this objective I have provided a blocker ring centering means in the form of a preloaded spring that establishes a proper relative position of the blocker ring with respect to the sleeve at all times, thus assuring that a blocking action will occur regardless of any wear or maladjustment of the linkage system used for actuating the sleeve.

It is another object of my invention to provide a sleeve positioning mechanism that definitely establishes each of its operating positions and that holds the sleeve in either the clutch engaged position or the clutch released position until it is shifted by the operator with a definite shifting motion of the linkage system.

The sleeve normally is provided with an annular groove within which the ends of the shifter fork are situated. The shifter fork in turn forms a part of the driver controlled linkage system for shifting the synchronizer sleeve. In a conventional arrangement it is possible for the sleeve to be displaced somewhat from its fully disengaged position when the linkage system is adjusted to its corresponding clutch disengaging position. The relative rotation between the sleeve and the shifter fork creates an accelerated rate of wear on the ends of the shift fork as the sleeve rotates relative to the fork. It is another object of my invention, therefore, to provide a synchronizer clutch mechanism wherein provision is made for accurately centering the sleeve as it assumes a clutch disengaging position thereby reducing the possibility of shifter fork wear.

For the purpose of describing more particularly the improvements of my invention, reference will be made to the accompanying drawings, wherein:

FIGURE 2 is a detailed elevation view of the blocker ring used with the assembly of FIGURE 1;

FIGURE 3 is an end view of the blocker ring of FIGURE 2;

FIGURE 4 is a detailed elevation view of a centering spring for the blocker ring used in the assembly of FIGURE 1;

FIGURE 5 is an end view of the spring of FIGURE 4;

FIGURE 6 is a detailed elevation view of a synchronizer hub for supporting the sleeve of the assembly of FIGURE 1;

FIGURE 7 is an end view of the hub of FIGURE 6; and

FIGURES 8A, 8B, 8C and 8D show a portion of the synchronizer teeth in an unwrapped assembly view. Each view illustrates the relative positions of the synchronizer teeth during a separate one of various operating stages of the assembly of FIGURE 1.

Figure 1:
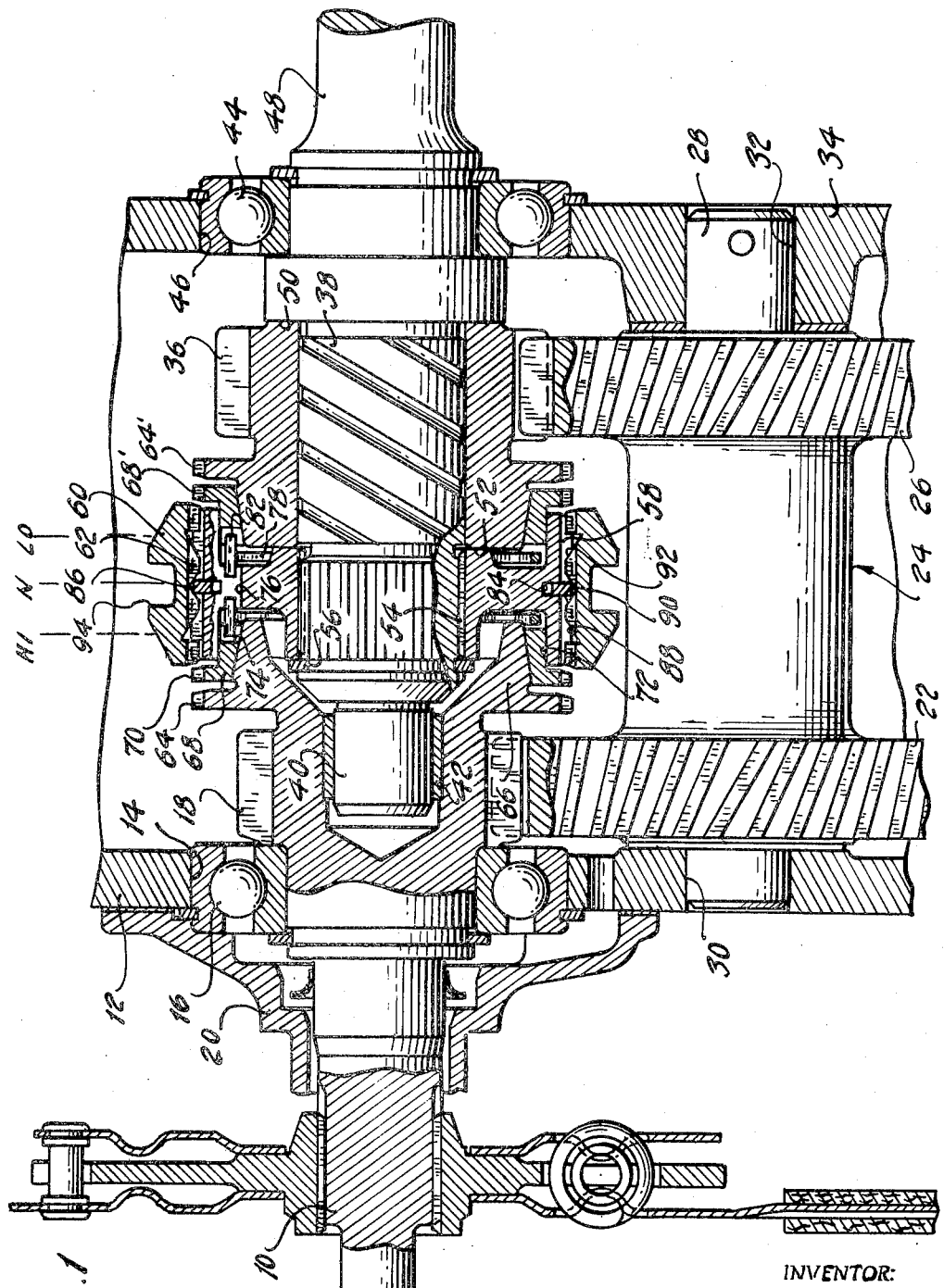
FIGURE 1 shows in cross sectional form an assembly view of a portion of a power transmitting gear system embodying the synchronizer assembly of my invention.

Referring first to FIGURE 1, numeral 10 designates a power input shaft for a power transmission mechanism. It may be connected to the crankshaft of an internal combustion vehicle engine through a releasable neutral clutch that is under the control of the vehicle operator.

A forward transmission housing wall 12 is provided with a bearing opening 14 for receiving a bearing 16. Bearing 16 rotatably journals shaft 10 and a power input gear 18 which is connected directly to shaft 10.

A bearing retainer and clutch throw-out bearing support 20 is bolted or otherwise secured to the outer face of forward wall 12.

Gear 18 engages drivably a cluster gear element 22 of a cluster gear assembly 24. This assembly which includes also a cluster gear element 26, is supported rotatably upon a countershaft 28, the ends of which are received within openings 30 and 32 formed in forward wall 12 and in rear transmission housing wall 34, respectively.

Gear element 26 engages drivably power output gear 36. This gear is journaled rotatably upon an intermediate shaft 38. The left-hand end of shaft 38, as viewed in FIGURE 1, is formed with a reduced diameter as shown at 40. A pilot opening 42 in the gear 18 receives the end 40. The other end of shaft 38 is journaled by means of a bearing 44 in a bearing opening 46 formed in wall 34. A power output shaft 48 is connected to and forms an extension of intermediate shaft 38. This shaft 48 can be connected by means of a suitable driveline and differential gearing to the traction wheels of the vehicle.

One side of the gear 36 engages a shoulder 50 formed on shaft 38. The other end of gear 36 engages a synchronizer hub 52 which is splined at 54 to the intermediate shaft 38. Hub 52 is held axially fast by means of a snap ring 56.

The periphery of hub 52 is formed with axially extending clutch teeth 58. Slidably mounted upon the hub 52 is a synchronizer clutch sleeve 60 having internal clutch teeth 62. Sleeve 60 can shift in either axial direction, as will be explained subsequently, although relative rotation of the sleeve 60 with respect to hub 52 is inhibited.

Gear 18 is formed with external clutch teeth 64. These are situated directly adjacent the external teeth 58 of the hub 52. A cone clutch element 66 carried by gear 18 is formed with an external cone surface. A cooperating internal cone surface is formed on a blocker ring 68. This ring, which has blocker ring teeth 70 located intermediate teeth 64 and the teeth 58, is piloted within a circular opening 72 formed by an axial extension for the periphery of hub 52.

Blocker ring 68 is formed with a radial slot 74 which is situated in direct juxtaposition with respect to axially extending slot 76 formed in the periphery of hub 52.

As best seen in FIGURES 4 and 5, I have provided a circular spring 78 that is split to provide two free ends. Each end is in the form of a T which includes an abutment portion. These abutment portions are designated in the drawings by reference characters 80 and 82. The corresponding sides of each abutment portion are received within slot 74 in the blocker ring 68. The other corresponding sides of the abutment portions 80 and 82 are received within the slot 76 of the hub 52.

The diameter of the spring 78 is less than the diameter of opening 72 so that the spring can be assembled as shown in FIGURE 1. When it is assembled in this fashion it will exert a predetermined degree of preload on the ends of the slots 74 and 76. This preload resists relative rotation of the blocker ring 68 with respect to the hub 52.

If torque is applied to the blocker ring, the spring will tend to yield. If the torque is sufficient to produce a force of approximately 10 lbs. on the abutment portions 80 and 82, the ends of the spring will engage each other. At that time the blocker ring 68 will have shifted an amount equal to one-half of the circular pitch of the teeth 70 and 58.

The gear 36 also is formed with external clutch teeth which correspond to clutch teeth 64 of the gear 18. These teeth for the gear 36 have been identified by the symbol 64'. Similarly, gear 36 is provided with a blocker ring 68' which corresponds in function to blocker ring 68. As the sleeve 60 is shifted in a right-hand direction as viewed in FIGURE 1, the teeth 62 engage teeth 64' to establish a connection between shaft 38 and gear 36. Similarly, if the sleeve 60 is shifted in a left-hand direction, teeth 62 engage teeth 64 thereby establishing a direct connection between gear 18 and shaft 38.

The periphery of hub 52 is formed with an annular groove 84 within which is situated a radially extendible split ring spring 86. This spring is adapted to be received within any one of three annular grooves 88, 90 or 92 formed in the inner periphery of the synchronizer ring 60. These grooves are formed with tapered sides so that the spring force tending to urge the spring 86 radially outwardly will cause the sleeve 60 to assume any one of three definite positions relative to the hub 52.

When the sleeve 60 is positioned so that spring 86 engages groove 88, the teeth 62 of the sleeve 60 are in driving engagement with teeth 64' for the gear 36. If the spring 86 engages groove 92, the sleeve 60 will have shifted fully in a left-hand direction to establish a driving connection between gear 18 and shaft 38. A precise neutral condition is established when spring 86 engages the groove 90.

The sleeve 60 is formed with an annular groove 94 that receives the ends of the shifter fork, not shown. This fork may form a part of a shift lever system that is under the control of the vehicle operator.

Spring 78 acts as a centering spring for the blocker ring 68. It normally tends to align slots 74 and 76, as indicated in FIGURE 1. When these slots are aligned the teeth 62 are disposed in alignment with the blocker ring teeth 70. If it is desired to connect gear 18 to the shaft 38, sleeve 60 is shifted in a left-hand direction by the vehicle operator. If the relative motion between gear 18 and shaft 38 is in the direction indicated by the directional arrow in FIGURE 8B, the chamfered ends of teeth 62 will engage the forward chamfered side of the teeth of blocker ring 68'. This condition is illustrated in FIGURE 8B whereas FIGURE 8A illustrates the teeth in an aligned condition. Continued movement of the sleeve 60 will be resisted by the blocking action of the teeth of ring 68'. This will be accompanied, however, by an engagement of the coned surfaces of the gear clutch element and the blocker ring 68' as the relative inertia of the rotating parts is dissipated. Finally, when synchronism between the relatively rotating parts is established, the spring 78 will yield sufficiently to permit the teeth 62 to pass through the teeth of ring 68'. This condition is illustrated in FIGURE 8C. The chamfered ends of the teeth 62 then engage the chamfered ends of the teeth 64', but since synchronism is established at this time the teeth 62 may move into a fully engaged position with respect to the teeth 62'. This condition is illustrated in FIGURE 8D. At that time the spring 86 engages groove 88.

It is apparent from the foregoing description that it is impossible to shift the sleeve 60 through the blocker ring since the blocker ring always is misaligned with respect to the teeth 62 prior to the shifting operation.

When the synchronizer clutch is disengaged, the blocker rings assume a precise radially spaced relationship with respect to the external cone surfaces of the cone clutch structures. This is due to the piloting action of the blocker rings within the circular openings formed in the periphery of the hub 52.

Having thus described a preferred form of my invention, what I claim and desire to secure by U.S. Letters Patent is:

1. In a synchronizer clutch assembly for connecting together a driving member and a driven member in a torque delivery system, external clutch teeth carried by one of said torque delivery members, a friction clutch element having a friction surface carried by said one torque delivery member, a synchronizer hub carried by the other torque delivery member, a synchronizer sleeve slidably mounted upon said synchronizer hub and adapted for axial shifting movement with respect to the axes of said torque delivery members, a blocker ring disposed between said hub and said clutch teeth, said blocker ring having external teeth situated adjacent said clutch teeth and a friction surface formed thereon, said sleeve having internal teeth formed therein, said blocker ring teeth being adapted to engage said internal teeth upon shifting movement of said sleeve toward said external clutch teeth, and spring means for adjusting said blocker ring relative to said hub so that the external teeth of said blocker ring normally are situated in the path of motion of the teeth of said sleeve as the latter is shifted toward said clutch element, the shifting effort applied to said sleeve following engagement of the teeth of said blocker ring by said sleeve causing said friction surfaces to engage thereby dissipating the relative inertia of said driving and driven members, said spring means comprising a circular resilient split ring disposed between said hub and said blocker ring, one end of said split ring being connected to said blocker ring and the other ring being connected to said hub.

2. In a synchronizer clutch assembly for connecting together a driving member and a driven member in a torque delivery system, external clutch teeth carried by one of said torque delivery members, a friction clutch element having a friction surface carried by said one torque delivery member, a synchronizer hub carried by the other torque delivery member, a synchronizer sleeve slidably mounted upon said synchronizer hub and adapted for axial shifting movement with respect to the axes of said torque delivery members, a blocker ring disposed between said hub and said clutch teeth, said blocker ring having external teeth situated adjacent said clutch teeth and a friction surface formed thereon, said sleeve having internal teeth formed therein, said blocker ring teeth being adapted to engage said internal teeth upon shifting movement of said sleeve toward said external clutch teeth, and spring means for adjusting said blocker ring relative to said hub so that the external teeth of said blocker ring normally are situated in the path of motion of the teeth of said sleeve as the latter is shifted toward said clutch element, the shifting effort applied to said sleeve following engagement of the teeth of said blocker ring by said sleeve causing said friction surfaces to engage thereby dissipating the relative inertia of said driving and driven members, said blocker ring being piloted within a portion of said hub, said spring means comprising a circular resilient split ring disposed between said hub and said blocker ring, one end of said split ring being connected to said blocker ring and the other ring being connected to said hub.

3. In a synchronizer clutch assembly for connecting together a driving member and a driven member in a torque delivery system, external clutch teeth carried by one of said torque delivery members, a friction clutch element having a friction surface carried by said one torque delivery member, a synchronizer hub carried by the other torque delivery member, a synchronizer sleeve slidably mounted upon said synchronizer hub and adapted for axial shifting movement with respect to the axes of said torque delivery members, a blocker ring disposed between said hub and said clutch teeth, said blocker ring having external teeth situated adjacent said clutch teeth and a friction surface formed thereon, said sleeve having internal teeth formed therein, said blocker ring teeth being adapted to engage said internal teeth upon shifting movement of said sleeve toward said external clutch teeth, a first slot formed in said hub and a second slot formed in said blocker ring, said slots being situated in juxtaposed relationship, and a split ring spring situated between said blocker ring and said hub, each end of said spring having an abutment portion extending in either axial direction therefrom, the circumferential width of said slots being substantially equal, said abutment portions being received in said slots whereby said spring resists relative rotation between said blocker ring and said hub, the teeth of said blocker ring being misaligned with respect to the teeth of said sleeve when said slots are aligned by said ring.

4. In a synchronizer clutch assembly for connecting together a driving member and a driven member in a torque delivery system, external clutch teeth carried by one of said torque delivery members, a friction clutch element having a friction surface carried by said one torque delivery member, a synchronizer hub carried by the other torque delivery member, a synchronizer sleeve slidably mounted upon said synchronizer hub and adapted for axial shifting movement with respect to the axes of said torque delivery members, a blocker ring disposed between said hub and said clutch teeth, said blocker ring having external teeth situated adjacent said clutch teeth and a friction surface formed thereon, said sleeve having internal teeth formed therein, said blocker ring teeth being adapted to engage said internal teeth upon shifting movement of said sleeve toward said external clutch teeth, a first slot formed in said hub and a second slot formed in said blocker ring, said slots being situated in juxtaposed relationship, and a split ring spring situated between said blocker ring and said hub, each end of said spring having an abutment portion extending in either axial direction therefrom, the circumferential width of said slots being substantially equal, said abutment portions being received in said slots whereby said spring resists relative rotation between said blocker ring and said hub, the teeth of said blocker ring being misaligned with respect to the teeth of said sleeve when said slots are aligned by said ring.

References Cited by the Examiner
UNITED STATES PATENTS 2,200,851  5/1940  Osborne.
2,417,566  3/1947  Polomski.
2,864,476  12/1958  Ashauer et al.

DAVID J. WILLIAMOWSKY, *Primary Examiner.*